(12) United States Patent
Yong et al.

(10) Patent No.: US 10,984,031 B2
(45) Date of Patent: Apr. 20, 2021

(54) TEXT ANALYZING METHOD AND DEVICE, SERVER AND COMPUTER-READABLE STORAGE MEDIUM

(71) Applicant: Baidu Online Network Technology (Beijing) Co., Ltd, Beijing (CN)

(72) Inventors: Qian Yong, Beijing (CN); Cunxiang Yin, Beijing (CN); Weijia Wu, Beijing (CN); Aikun Li, Beijing (CN); Shengli Yan, Beijing (CN); Ting Wei, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 134 days.

(21) Appl. No.: 16/116,678

(22) Filed: Aug. 29, 2018

(65) Prior Publication Data
US 2019/0197129 A1    Jun. 27, 2019

(30) Foreign Application Priority Data
Dec. 26, 2017   (CN) .......................... 201711436235.5

(51) Int. Cl.
*G06F 16/33* (2019.01)
*G06F 40/30* (2020.01)
*G06F 40/247* (2020.01)

(52) U.S. Cl.
CPC ...... *G06F 16/3347* (2019.01); *G06F 16/3334* (2019.01); *G06F 40/247* (2020.01); *G06F 40/30* (2020.01)

(58) Field of Classification Search
USPC ................................................. 704/9, 1–504
See application file for complete search history.

(56) References Cited

U.S. PATENT DOCUMENTS

| 8,583,422 B2 * | 11/2013 | Todhunter ........... G04F 16/3329 704/9 |
| 2010/0235165 A1 * | 9/2010 | Todhunter ............... G06F 40/35 704/9 |

(Continued)

FOREIGN PATENT DOCUMENTS

| CN | 102194013 A | 9/2011 |
| CN | 102411583 A | 4/2012 |

(Continued)

OTHER PUBLICATIONS

Chen et al., "Statistical Analysis of Weibo User Characteristic Behavior Based on Individual Attributes," Knowledge Management Forum, No. 3, 2013 (64 Total), 16-21.

(Continued)

*Primary Examiner* — Marcus T Riley
(74) *Attorney, Agent, or Firm* — Akerman LLP

(57) ABSTRACT

A text analyzing method and device, and a server are provided by the present disclosure. The method includes: acquiring a target text and a first set of texts to be compared, wherein the first set of texts to be compared comprises at least one text to be compared, and each text to be compared is a search text entered by a user in one search; calculating a text similarity between the text to be compared and the target text based on a semantic similarity algorithm for short text, and determining a text to be compared with a text similarity higher than a first threshold as an object to be analyzed; and determining a target user entering the object to be analyzed; and statistically analyzing the target user based on at least one attribute of the target user, to generate and output an analyzing result of the target text respective to the target user.

9 Claims, 5 Drawing Sheets

(56) References Cited

U.S. PATENT DOCUMENTS

| | | | | |
|---|---|---|---|---|
| 2014/0297269 A1* | 10/2014 | Qian | ................... | G06F 16/94 |
| | | | | 704/9 |
| 2017/0017638 A1* | 1/2017 | Satyavarta | .............. | G06F 40/30 |
| 2017/0357890 A1* | 12/2017 | Kim | ................... | G06F 40/30 |
| 2019/0197129 A1* | 6/2019 | Yong | ................... | G06F 40/247 |

FOREIGN PATENT DOCUMENTS

| | | | |
|---|---|---|---|
| CN | 103258008 | A | 8/2013 |
| CN | 104102626 | A | 10/2014 |
| CN | 104834679 | A | 8/2015 |
| CN | 105095223 | A | 11/2015 |
| CN | 106782560 | A | 5/2017 |
| CN | 106844350 | A | 6/2017 |

OTHER PUBLICATIONS

Notification of the First Office Action dated Feb. 1, 2021, issued in connection with Chinese Patent Application No. 2017114362355.
Search Report dated Jan. 23, 2021, issued in connection with Chinese Patent Application No. 2017114362355.

\* cited by examiner

TEXT ANALYZING METHOD AND DEVICE, SERVER AND COMPUTER-READABLE STORAGE MEDIUM

The present application claims the benefit of priority to Chinese patent application No. 201711436235.5, filed before the State Intellectual Property Office on Dec. 26, 2017, and entitled "Text Analyzing Method and Device, Server and Computer-Readable Storage Medium", which is incorporated in the present application by reference in its entirety.

TECHNICAL FIELD

The disclosure relates to the Internet field, and in particular to a text analyzing method and device, as well as a server and a computer-readable storage medium.

BACKGROUND

At present, Internet technology has been widely used on a global scale. People are increasingly participating in various activities over Internet. Network media have also become a non-negligible emerging medium which has been paid more attention.

As compared with traditional a media such as newspaper, radio broadcast and television, network media has various features such as a low entry cost, massive scale of information, rapid information distributing and spreading, a large number of participants, and enhanced real-time interaction. Since the cost for publishing network information is extremely low, there is no clear boundary among providers, spreaders, and readers of the information. Information network has become a "virtual society" with very distinct social group characteristics. Especially when an event occurs, people will participate in discussions the event by means of news commentary, community forums, microblog or the like. Through corresponding analysis on public opinion, people's concern and other important information may be obtained.

A critical object of the analysis on the public opinion is to analyze and determine the audience of the event. An important issue to be solved urgently is how to accurately determine the audience of an event through the analysis on the massive data generated on the network.

SUMMARY

A text analyzing method and device, and a server are provided according to embodiments of the present disclosure, with the purpose of at least solving the above technical problems in the related art.

In a first aspect, a text analyzing method is provided according to an embodiment of the present disclosure, which includes:
acquiring a target text and a first set of texts to be compared, wherein the first set of texts to be compared includes at least one text to be compared, and each text to be compared is a search text entered by a user in one search;
calculating a text similarity between the text to be compared and the target text based on a semantic similarity algorithm for short text, and determining a text to be compared with a text similarity higher than a first threshold as an object to be analyzed; and
determining a target user entering the object to be analyzed; and statistically analyzing the target user based on at least one attribute of the target user, to generate and output an analyzing result of the target text respective to the target user.

In conjunction with the first aspect, in a first embodiment of the first aspect of the disclosure, the calculating a text similarity between each text to be compared and the target text based on a semantic similarity algorithm for short text, and determining a text to be compared with a text similarity higher than a first threshold as an object to be analyzed includes:
calculating a first similarity between the text to be compared and the target text by Elasticsearch;
selecting at least one text to be compared with a first similarity higher than a second threshold from the first set of texts to be compared, as a second set of texts to be compared;
word-segmenting the target text to obtain at least one keyword, vectoring each keyword with a word2vec model to obtain at least one vector, and summing the at least one vector to obtain a first summing result;
for each text in the second set of texts to be compared, word-segmenting the text to obtain at least one text keyword, vectoring each text keyword with a word2vec model to obtain at least one vector for the text, and summing the at least one vector for the text to obtain a second summing result; and
calculating the text similarity between a text to be compared in the second set of texts to be compared and the target text based on the first summing result and the second summing, and determining a text to be compared with the text similarity higher than the first threshold as the object to be analyzed.

In conjunction with the first embodiment of the first aspect, the text similarity is a cosine similarity, and is calculated by the following formula:

$$sim(X, Y) = \cos\theta = \frac{\vec{x} \cdot \vec{y}}{\|x\| \cdot \|y\|}$$

wherein x and y is a vector respectively, and sim (X, Y) is a similarity between the vectors x and y.

In conjunction with the first aspect, in a second embodiment of the first aspect of the disclosure, the determining a target user entering the object to be analyzed; and statistically analyzing the target user based on at least one attribute of the target user, to generate and output an analyzing result of the target text respective to the target user includes:
acquiring an attribute of the target user entering the object to be analyzed;
selecting at least one attribute with a confidence level higher than a third threshold from a preset attribute library; and
statistically analyzing the target user entering the object to be analyzed based on the at least one attribute, to generate and output the analyzing result of the target text respective to the target user.

In conjunction with the first aspect, in a third embodiment of the first aspect of the disclosure, the text to be compared is a search text entered by the user din one search within a preset time period.

In a second aspect, an embodiment of the present disclosure provides a device for statistically analyzing text data, which includes:
an acquiring module configured for acquiring a target text and a first set of texts to be compared, wherein the first set of texts to be compared comprises at least one text to be compared, and each text to be compared is a search text entered by a user in one search;

a similarity calculating module configured for calculating a text similarity between the text to be compared and the target text based on a semantic similarity algorithm for short text, and determining a text to be compared with a text similarity higher than a first threshold as an object to be analyzed; and an analyzing module configured for determining a target user entering the object to be analyzed; and statistically analyzing the target user based on at least one attribute of the target user, to generate and output an analyzing result of the target text respective to the target user.

The functions may be implemented by hardware, or also by hardware executing corresponding software. The hardware or software includes one or more modules corresponding to the above functions.

In a third aspect, an embodiment of the present disclosure provides a server, including:

one or more processors;

a storage device configured for storing one or more programs; and a communication interface configured for enabling the processor and the storage device to communicate with an external device, wherein when the one or more programs are executed by the one or more processors, the one or more processors are caused to implement the methods described above.

In a fourth aspect, an embodiment of the present disclosure provides a computer-readable storage medium for storing computer software instructions used by the text analyzing device, wherein the computer-readable storage medium includes a program involved in the text analyzing device for performing the text analyzing method.

Another one of the foregoing technical solutions has the following advantages or advantageous effects: in the embodiment of the present disclosure, a similarity between the text to be compared, which is a search text entered by a user, and a target text is calculated by using a semantic similarity algorithm for short text, the text to be compared with a similarity higher than a threshold is determined as an object to be analyzed, and then a statistical analysis result is output based on an attribute for a target entering the object to be analyzed, so that the user interested in the target text (that is, the audience interested in an event corresponding to the target text) is analyzed.

The above summary is provided only for illustration, and is not intended to limit the disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION

Hereinafter, only some exemplary embodiments are simply described. As can be recognized by those skilled in the art, the described embodiments may be modified in various different ways without departing from the spirit or scope of the present disclosure. Accordingly, the drawings and the description should be considered as illustrative in nature instead of being restrictive.

Figure 1:
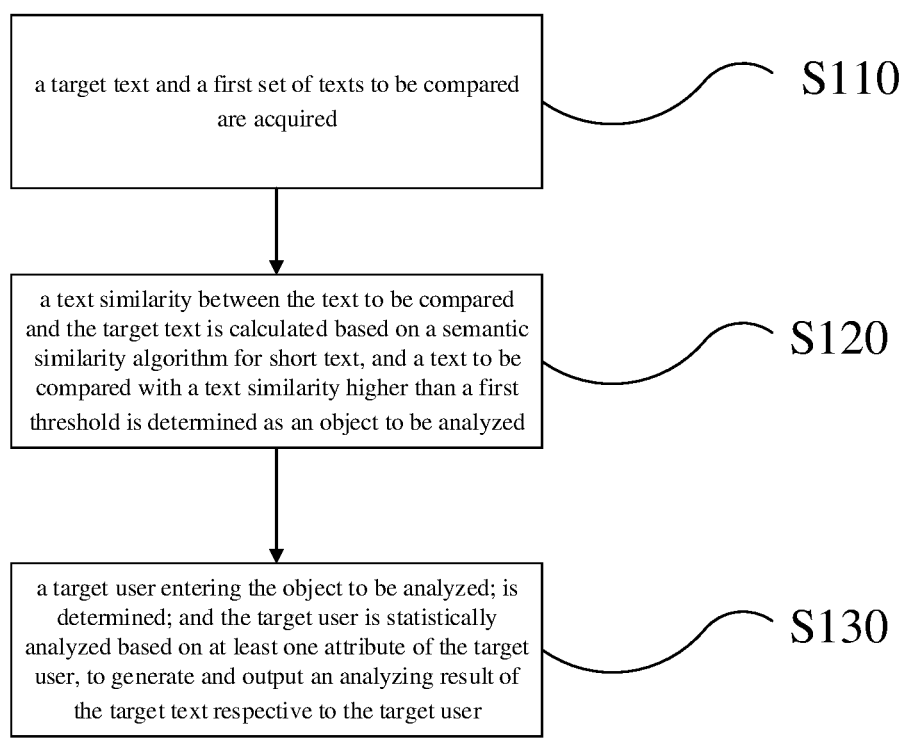
FIG. 1 is a flowchart of a text analyzing method according to an embodiment of the present disclosure.

FIG. 1 shows a flowchart of a text analyzing method 100 according to a first embodiment of the present disclosure. As shown in FIG. 1, the text analyzing method 100 includes steps S110 to S130.

In Step S110, a target text and a first set of texts to be compared are acquired. The first set of texts to be compared includes at least one text to be compared, and each of the texts to be compared is a search text entered by a user in one search.

In a preferred embodiment of the present disclosure, the target text is description of an event in the form of text, preferably a news headline, such as "Jay ZHOU's concert in Beijing" or "Apple released iPhone 8". Hereinafter, by taking the text "Jay ZHOU's concert in Beijing" as the target text, the text analyzing method provided by the embodiment of the present disclosure is described in detail.

In an embodiment of the present disclosure, the text to be compared is a search text entered by the user in one search. It is understood that the text analyzing method provided by the embodiment of the present disclosure may be performed repeatedly. The number of texts to be compared acquired when the method is performed at this time is different from that acquired when the method is performed for the next time. This is because an additional search may be conducted during the time interval between this time and the next time.

In addition, in a case that the target text is a news headline, it is necessary to consider the timeliness of the news in order to ensure the accuracy of the analyzing result. It is understood that the at least one text to be compared acquired in step S110 may be search data entered by the user within a preset time period. In particular, the preset time period may be 24 hours, 48 hours, or even one week, depending on the content of the target text, which is not specifically limited herein.

In step S120: a text similarity between the text to be compared and the target text is calculated based on a semantic similarity algorithm for short text, and a text to be compared with a text similarity higher than a first threshold is determined as an object to be analyzed.

Currently, the similarity between two texts is generally calculated by firstly splitting the text and selecting a keyword. In addition, in an embodiment of the present disclosure, the target text and the text to be compared are short in length, and only relates to one topic. In view of this, in an embodiment of the present disclosure, similarity analysis is performed by a semantic similarity algorithm for short text, so as to determine the object to be analyzed more accurately.

For example, literally, "Beijing" and "capital" are not similar, but in Chinese, they have the same meaning. In addition, due to differences in languages, texts that are seemingly not similar to each other at all may also express the same meaning. For example, "Xingchi ZHOU" and "Stephen Chow" refer to the same person, and "Yinyue" and "music" have the same meaning. In addition, words sometimes have special correlation with each other. For example, for "Jay ZHOU's concert in Bird's Nest" and "Jay ZHOU's concert in Beijing", the keywords "Bird's Nest" and "Beijing" seem to have no correlation with each other. However, there is a correlation between the two searches associated to the two texts since the Bird's Nest is located in Beijing and is often used for holding a concert.

In this case, if only the characters in the text are compared, a lot of information will be missed. Therefore, in the embodiments of the present disclosure, the semantic similarity algorithm for short text is applied to analyze a text.

Figure 2:
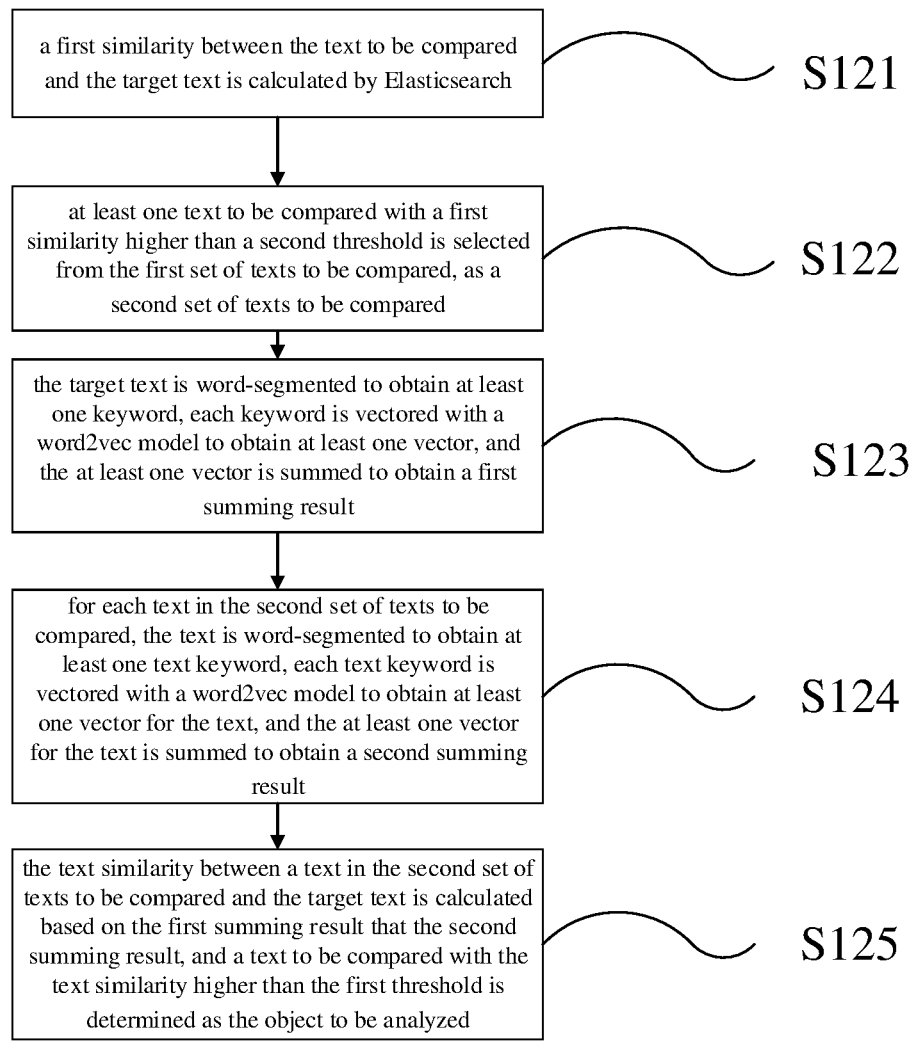
FIG. 2 is a flowchart of a method for calculating a similarity according to an embodiment of the present disclosure.

As shown in FIG. 2, in an embodiment of the present disclosure, step S120 may include the following steps S121 to S125.

In step S121, a first similarity between the text to be compared and the target text is calculated by Elasticsearch.

ElasticSearch is a Lucene-based search server. It provides a distributed multi-user-enabled full-text search engine based on a RESTful web interface. Elasticsearch was developed in Java and released as open source codes under the Apache license terms, and is an enterprise search engine that is currently prevailing. It is designed for cloud computing, and has advantages such as performing a search in real time, stable, reliable, efficient, and easy to install and use.

In this embodiment, the first similarity is calculated by using a similarity algorithm that is built-in in the Elasticsearch. Lucene (a full-text search engine) is used in a bottom layer of the ElasticSearch, and score calculation in Lucene is performed by integrating a Boolean model, TF-IDF, and a vector space model. In the Elasticsearch, a default tf/idf model, and three similarity models of bm25, drf and ib are provided. In this embodiment, any one or more of the above models may be applied as required to calculate the first similarity.

In step S122, at least one text to be compared with a first similarity higher than a second threshold is selected from the first set of texts to be compared, as a second set of texts to be compared.

In this embodiment, the Elasticsearch is used for preliminary selecting, for preliminarily filtering the texts to be compared, thereby further improving the accuracy of object determining.

In step S123, the target text is word-segmented to obtain at least one keyword, each keyword is vectored with a word2vec model to obtain at least one vector, and the at least one vector is summed to obtain a first summing result.

In step S124, for each text in the second set of texts to be compared, the text is word-segmented to obtain at least one text keyword, each text keyword is vectored with a word2vec model to obtain at least one vector for the text, and the at least one vector for the text is summed to obtain a second summing result.

It is well known that a character is the smallest unit in Chinese language, but in actual use, the smallest language unit that may be used independently is a Chinese word. A Chinese sentence, which is a character string used in a computer, is often difficult to be understood by a machine. Therefore, in practical applications, the key technology for Chinese language processing is word segmentation. On the basis of word segmentation, upper layer applications may be performed, such as syntactic analysis, machine translation, and semantic understanding.

Therefore, in an embodiment of the present disclosure, in order to perform the similarity calculation, it is necessary to word-segment the target text and each text in the second set of texts to be compared. It should be noted that for word segmentation, a punctuation mark, a special symbol (such as underline), or a stop word may be deleted from the text firstly, in order to obtain a more accurate result. A stop word refers to a certain character or word that is automatically filtered out before or after processing natural language data (or text) in information search so as to save storage space and improve search efficiency. Steps S123 and S124 may be performed by any existing means, which is not specifically limited herein.

The word2vec model is essentially a model of matrix decomposition. Briefly speaking, a matrix herein describes a set of a word and a word in the context thereof. The matrix is decomposed and only a vector corresponding to each word in an implicit space are used. For a short text, the vectors corresponding to all the words in the text may be summed directly and linearly to use in a training classifier of a text feature, so as to perform the text analysis.

In step S125, the text similarity between a text in the second set of texts to be compared and the target text is calculated based on the first summing result that the second summing result, and a text to be compared with the text similarity higher than the first threshold is determined as the object to be analyzed.

In a preferred embodiment of the present disclosure, the text similarity is a cosine similarity. The cosine similarity is used to evaluate the similarity of two vectors by calculating the cosine value of the angle between the two vectors. However, it is understood that the first similarity in the embodiments of the present disclosure may also be of another type, and may be selected as actually required, which is not specifically limited herein.

In particular, the cosine similarity may be calculated using the following formula:

$$sim(X, Y) = \cos\theta = \frac{\vec{x} \cdot \vec{y}}{\|x\| \cdot \|y\|}$$

wherein x and y is a vector respectively, and sim (X, Y) is a similarity between vectors x and y.

In step S125, a further filtering may be performed on the texts to be compared, so that the determined object to be analyzed is more accurate and targeted.

In step S130, a target user entering the object to be analyzed; is determined; and the target user is statistically analyzed based on at least one attribute of the target user, to generate and output an analyzing result of the target text respective to the target user.

After determining the object to be analyzed in step S120, the target user entering the object to be analyzed is analyzed to obtain the audience of the target text.

In this embodiment, the target user is a user a user who enters a search text with a similarity higher than the first threshold with the target text. The statistical analysis is performed based on at least one attribute of the target user.

In a preferred embodiment of the present disclosure, the at least one attribute may include gender, age, region, career, etc., although it is conceivable that the user also has other attributes which are not be listed herein. Any feature that may be used to divide users into different groups may be referred to as an attribute, such as the education background of a user.

In this embodiment, the attribute may be obtained by any existing technology, such as a common gripping tool, which is not specifically limited herein. The statistical analysis on the target user is based on the statistics of the number of users for each attribute, and thereby a statistical result is generated and output.

It is understood that the at least one attribute may be selected as actually required. For example, for an entertainment-related event, the user's age, gender, and other related attributes may be selected; and for a politics-related event, the user's education background, age, and other related attributes may be selected. The selection of attributes is also related to the reliability of the final statistical result.

With the above methods, the search data related to the target text may be analyzed, and then the statistical result of the corresponding user, which is the audience of the target text, may be acquired for providing a reference for public opinion analysis.

Figure 3:
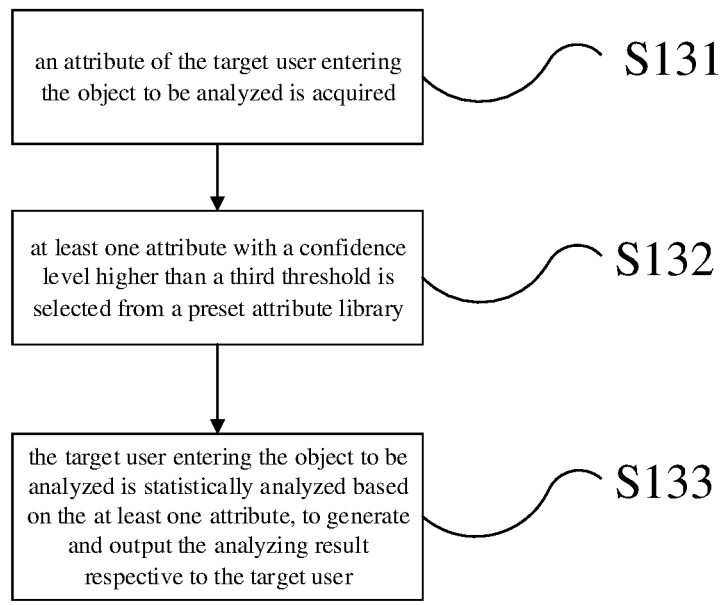
FIG. 3 is a flowchart of a method for analyzing a user based on a user attribute according to an embodiment of the present disclosure.

In an embodiment of the present disclosure, as shown in FIG. 3, step S130 may include the following steps S131 to S133.

In step S131, an attribute of the target user entering the object to be analyzed is acquired.

This step may be implemented by any one of the existing technologies, which is not specifically limited herein.

In step S132, at least one attribute with a confidence level higher than a third threshold is selected from a preset attribute library.

In an embodiment of the present disclosure, the preset library may be any attribute database that includes a user ID, a name of the user attribute, a confidence level of each attribute, and other information. The information in the library, particularly the confidence level, may be acquired using any one of the existing technologies, which is not specifically limited herein.

It is understood that the acquired confidence level of the user attributes are not necessarily identical with each other. The higher the confidence level is, the more reliable and accurate the attribute will be. Therefore, it is necessary to filter the attributes. In a preferred embodiment of the present disclosure, the threshold of confidence level may be 80, although other values may also be used, depending on the desired accuracy of the result.

For example, the information of the user in the preset library is: gender: female, confidence level: 90; age: 25-34, confidence level: 98; city: Guangzhou; confidence level: 60.

In the above information, gender, age and city are respectively a name of a user attribute, and the confidence levels of these attributes are not identical. Since the attribute "city" of the user has a confidence level of 60, which is lower than the third threshold 80, it cannot be used for statistical analysis on audiences of an event.

In step S133, the target user entering the object to be analyzed is statistically analyzed based on the at least one attribute, to generate and output the analyzing result respective to the target user.

With the above method, the attributes used in the statistical analysis may be filtered, and only an attributes with a high confidence level is used for the statistically analysis. The generated result is more accurate and the user's description is more credible.

In particular, in the embodiments of the present disclosure, the first, second and third thresholds may be set as actually required, which are not specifically limited herein.

The text analyzing method provided by the embodiments of the present disclosure will now be described in detail in a specific example. In this specific example, the target text is "Jay ZHOU's concert in Beijing".

Firstly, the first analysis on the audience of the corresponding event is to obtain search data in a certain time period, for example, 48 hours. Secondly, the target text and the acquired search data are analyzed with the semantic similarity algorithm for short text to obtain the text to be compared with a similarity higher than the first threshold, and this text is determined as an object to be analyzed. For example, in this example, the text like "Zhou Jielun concert in the capital" and "Jay Zhou's concert in the capital" will be considered as an object to be analyzed. Afterwards, the audience of the event may be updated in an incremental updating manner, i.e. the user analyzing based on text analysis provided by the embodiments of the present disclosure is repeated at a preset interval so that the generated result is updated and the result is more accurate.

In this example, since Jay Zhou holds a concert in Beijing, the age and geographical location may be selected as the attributes for analyzing the target user. For convenience of performing statistics, the attribute "age" may be divided into age groups for statistics, such as, 10-15, 15-20 . . . .

The generated statistical result may be output in a more intuitive way, for example, in pie charts, bar charts, etc., and the statistical result may be directly displayed on a display device so that the statistical result is clear at a glance, and the audience of this event "Jay Zhou's concert in Beijing" may be clearly observed.

Figure 4:
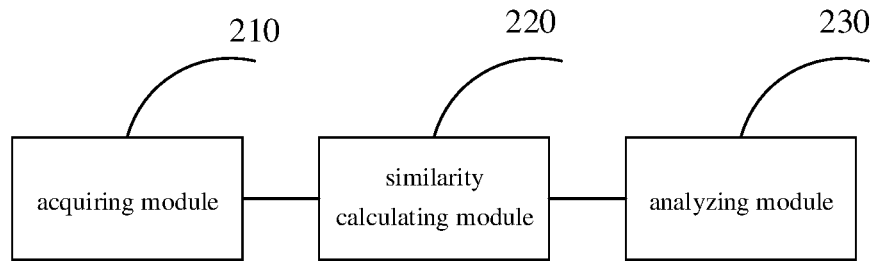
FIG. 4 is a schematic structural diagram of a text analyzing device according to another embodiment of the present disclosure.

FIG. 4 shows a schematic structural diagram of a text analyzing device 200 according to an embodiment of the present disclosure. The device 200 may include an acquiring module 210, a similarity calculating module 220 and an analyzing module 230.

The acquiring module 210 is configured for acquiring a target text and a first set of texts to be compared, wherein the first set of texts to be compared comprises at least one text to be compared, and each text to be compared is a search text entered by a user in one search.

The similarity calculating module 220 is configured for calculating a text similarity between the text to be compared and the target text based on a semantic similarity algorithm for short text, and determining a text to be compared with a text similarity higher than a first threshold as an object to be analyzed.

The analyzing module 230 is configured for determining a target user entering the object to be analyzed; and statistically analyzing the target user based on at least one attribute of the target user, to generate and output an analyzing result of the target text respective to the target user.

Each text to be compared may be a search text entered by the user in one search within a preset time period.

Figure 5:
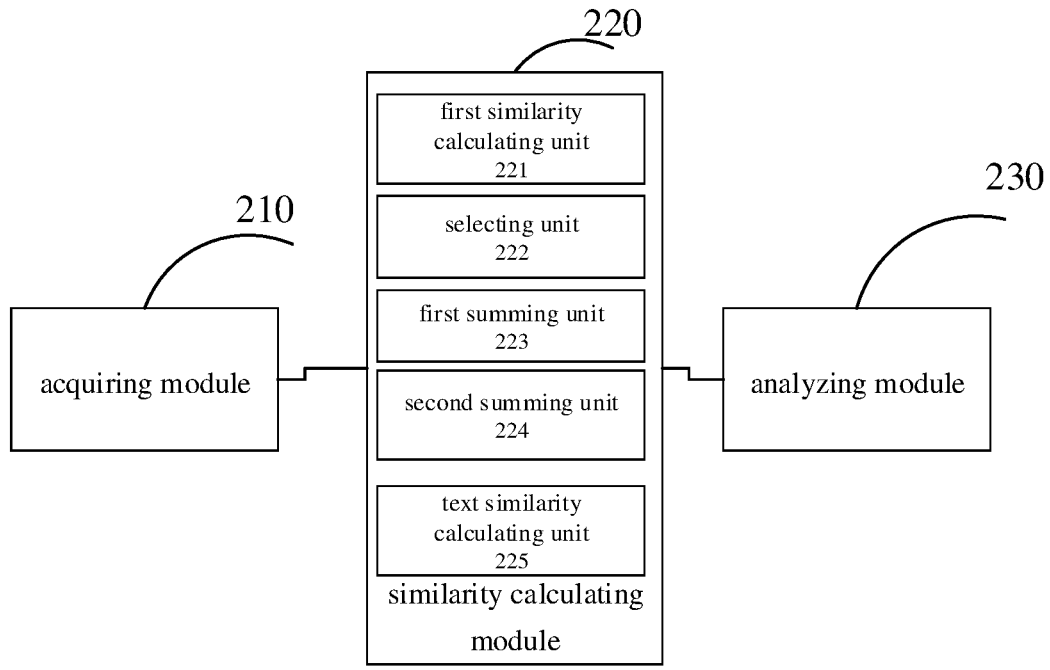
FIG. 5 is a schematic structural diagram of a text analyzing method according to further another embodiment of the present disclosure.

As shown in FIG. 5, in a preferred embodiment of the present disclosure, the similarity calculating module 220 may include a first similarity calculating unit 221, a selecting unit 222, a first summing unit 223, a second summing unit 224 and a text similarity calculating unit 225.

The first similarity calculating unit 221 is configured for calculating a first similarity between the text to be compared and the target text by Elasticsearch.

The selecting unit 222 is configured for selecting at least one text to be compared with a first similarity higher than a second threshold from the first set of texts to be compared, as a second set of texts to be compared.

The first summing unit 223 is configured for word-segmenting the target text to obtain at least one keyword, vectoring each keyword with a word2vec model to obtain at least one vector, and summing the at least one vector to obtain a first summing result.

The second summing unit 224 is configured for, for each text in the second set of texts to be compared, word-segmenting the text to obtain at least one text keyword, vectoring each text keyword with a word2vec model to obtain at least one vector for the text, and summing the at least one vector for the text to obtain a second summing result.

A text similarity calculating unit 225 is configured for calculating a text similarity between a text in the second set of texts to be compared and the target text based on the first summing result and the second summing result, and determining a text to be compared with the text similarity higher than the first threshold as the object to be analyzed.

Here, the text similarity is a cosine similarity, and may be calculated using the following formula:

$$sim(X, Y) = \cos\theta = \frac{\vec{x} \cdot \vec{y}}{\|x\| \cdot \|y\|}$$

wherein x and y are vectors respectively, and sim (X, Y) is the similarity between vectors x and y.

Figure 6:
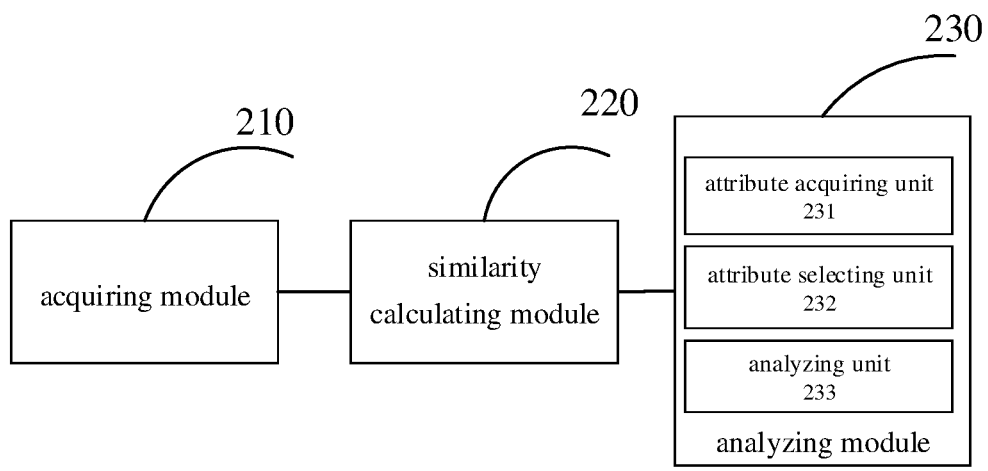
FIG. 6 is a schematic structural diagram of a text analyzing method according to still further another embodiment of the present disclosure.

As shown in FIG. 6, according to a preferred embodiment of the present disclosure, the analyzing module 230 may include an attribute acquiring unit 231, an attribute selecting unit 232 and an analyzing unit 233.

The attribute acquiring unit 231 is configured for acquiring an attribute of the target user entering the object to be analyzed.

The attribute selecting unit 232 is configured for selecting at least one attribute with a confidence level higher than a third threshold from a preset attribute library.

The analyzing unit 233 is configured for statistically analyzing the target user entering the object to be analyzed based on the at least one attribute, to generate and output the analyzing result of the target text respective to the target user.

Figure 7:
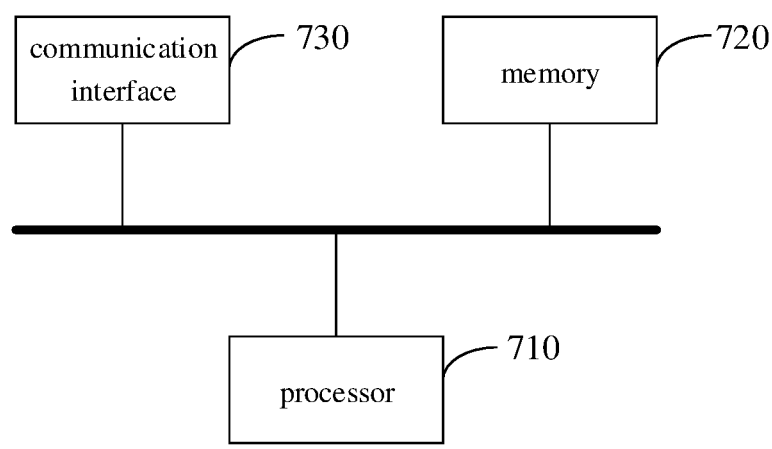
FIG. 7 is a schematic structural diagram of a server according to yet another embodiment of the present disclosure.

FIG. 7 shows a schematic structural diagram of a server 700 according to another embodiment of the present disclosure. As shown in FIG. 7, the server 700 includes:

one or more processors 710;

a memory 720 configured for storing one or more programs; and a communication interface 730 configured for enabling the processor 710 and the memory 720 to communicate with an external device, wherein when the one or more programs are executed by the one or more processors 710, the one or more processors 710 are caused to implement any of the foregoing text analyzing methods.

Another embodiment of the present disclosure provides a computer-readable storage medium for storing a computer program which, when executed by a processor, implements any of the foregoing text analyzing methods.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the disclosure. Moreover, the specific features, structures, materials, or characteristics described may be combined in a suitable manner in any one or more embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowcharts or described otherwise herein may be construed as representing a module, segment or portion including codes for executing one or more executable instructions for implementing a particular logical function or process steps. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowchart or otherwise described herein for example may be considered as an ordered list of executable instructions for implementing logical functions. They can be specifically embodied in any computer-readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "computer-readable medium" can be any means that can contain, store, communicate, propagate or transmit programs for use by an instruction execution system, apparatus or device or for use in conjunction with the instruction execution system, apparatus or device. More specific examples (non-exhaustive list) of computer-readable medium include: electrical connection parts (electronic devices) having one or more wires, portable computer disk cartridges (magnetic devices), random access memory (RAM), read only memory (ROM), erasable programmable read only memory (EPROM or flash memory), fiber optic devices, and portable read only memory (CDROM). In addition, the computer-readable medium may even be a paper or other suitable medium on which the programs can be printed. This is because for example the paper or other medium can be optically scanned, followed by editing, interpretation or, if necessary, other suitable ways of processing so as to obtain the programs electronically, which are then stored in a computer memory.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: discrete logic circuits having logic gate circuits for implementing logic functions on data signals, application-specific integrated circuits having suitable combined logic gate circuits, programmable gate arrays (PGA), field programmable gate arrays (FPGA), etc.

Those skilled in the art may understand that all or part of the steps carried in the method of the foregoing embodiments may be implemented by using a program to instruct the relevant hardware, and the program may be stored in a computer-readable storage medium. When executed, the program includes one or a combination of the steps in the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer-readable storage medium if it is implemented in the form of a software functional module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be determined by the scope of the appended claims.

What is claimed is:

1. A text analyzing method, the method comprising:
    acquiring a target text and a first set of texts to be compared, wherein the first set of texts to be compared comprises at least one text to be compared, and each text to be compared is a search text entered by a user in one search;
    calculating a text similarity between the text to be compared and the target text based on a semantic similarity algorithm for short text, and determining a text to be compared with a text similarity higher than a first threshold as an object to be analyzed, wherein the calculating a text similarity between each text to be compared and the target text based on a semantic similarity algorithm for short text, and determining a text to be compared with a text similarity higher than a first threshold as an object to be analyzed comprises:
        calculating a first similarity between the text to be compared and the target text by Elasticsearch;
        selecting at least one text to be compared with a first similarity higher than a second threshold from the first set of texts to be compared, as a second set of texts to be compared;
        word-segmenting the target text to obtain at least one keyword, vectoring each keyword with a word2vec model to obtain at least one vector, and summing the at least one vector to obtain a first summing result;
        for each text in the second set of texts to be compared, word-segmenting the text to obtain at least one text keyword, vectoring each text keyword with a word2vec model to obtain at least one vector for the text, and summing the at least one vector for the text to obtain a second summing result; and
    calculating a text similarity between a text in the second set of texts to be compared and the target text based on the first summing result and the second summing result, and determining a text to be compared with the text similarity higher than the first threshold as the object to be analyzed; and
    determining a target user entering the object to be analyzed; and statistically analyzing the target user based on at least one attribute of the target user, to generate and output an analyzing result of the target text respective to the target user.

2. The method of claim 1, wherein the text similarity is a cosine similarity which is calculated by the following formula:

$$sim(X, Y) = \cos\theta = \frac{\vec{x} \cdot \vec{y}}{\|x\| \cdot \|y\|},$$

wherein x and y are vectors, and sim (X, Y) is a similarity between the vectors x and y.

3. The method of claim 1, wherein the determining a target user entering the object to be analyzed; and statistically analyzing the target user based on at least one attribute of the target user, to generate and output an analyzing result of the target text respective to the target user comprises:
    acquiring an attribute of the target user entering the object to be analyzed;
    selecting at least one attribute with a confidence level higher than a third threshold from a preset attribute library; and
    statistically analyzing the target user entering the object to be analyzed based on the at least one attribute, to generate and output the analyzing result of the target text respective to the target user.

4. The method of claim 1, wherein the text to be compared is a search text entered by the user in one search within a preset time period.

5. A text analyzing device, the device comprising:
    one or more processors; and
    a memory configured for storing one or more programs, wherein
    the one or more programs are executed by the one or more processors to enable the one or more processors to:
    acquire a target text and a first set of texts to be compared, wherein the first set of texts to be compared comprises at least one text to be compared, and each text to be compared is a search text entered by a user in one search;
    calculate a text similarity between the text to be compared and the target text based on a semantic similarity algorithm for short text, and determine a text to be compared with a text similarity higher than a first threshold as an object to be analyzed; and
    determine a target user entering the object to be analyzed; and statistically analyze the target user based on at least one attribute of the target user, to generate and output an analyzing result of the target text respective to the target user;

wherein the one or more programs are executed by the one or more processors to enable the one or more processors further to:

calculate a first similarity between the text to be compared and the target text by Elasticsearch;

select at least one text to be compared with a first similarity higher than a second threshold from the first set of texts to be compared, as a second set of texts to be compared;

word-segment the target text to obtain at least one keyword, vector each keyword with a word2vec model to obtain at least one vector, and sum the at least one vector to obtain a first summing result;

for each text in the second set of texts to be compared, word-segment the text to obtain at least one text keyword, vector each text keyword with a word2vec model to obtain at least one vector for the text, and sum the at least one vector for the text to obtain a second summing result; and calculate a text similarity between a text in the second set of texts to be compared and the target text based on the first summing result and the second summing result, and determine a text to be compared with the text similarity higher than the first threshold as the object to be analyzed.

6. The device of claim 5, wherein the text similarity is a cosine similarity, and is calculated by the following formula:

$$sim(X, Y) = \cos\theta = \frac{\vec{x} \cdot \vec{y}}{\|x\| \cdot \|y\|}$$

wherein x and y are vectors, and sim (X, Y) is a similarity between vectors x and y.

7. The device of claim 5, wherein the one or more programs are executed by the one or more processors to enable the one or more processors further to:

acquire an attribute of the target user entering the object to be analyzed;

select at least one attribute with a confidence level higher than a third threshold from a preset attribute library; and statistically analyze the target user entering the object to be analyzed based on the at least one attribute, to generate and output the analyzing result of the target text respective to the target user.

8. The device of claim 5, wherein the text to be compared is a search text entered by the user in one search within a preset time period.

9. A non-transitory computer-readable storage medium, in which a computer program is stored, wherein the computer program, when executed by a processor, implements the method of claim 1.

* * * * *